United States Patent
Donderici

(10) Patent No.: US 12,269,510 B2
(45) Date of Patent: Apr. 8, 2025

(54) RARE SCENARIO HANDLING FOR AUTONOMOUS VEHICLES

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 217 days.

(21) Appl. No.: 17/961,401

(22) Filed: Oct. 6, 2022

(65) Prior Publication Data

US 2024/0116539 A1 Apr. 11, 2024

(51) Int. Cl.
*B60W 60/00* (2020.01)
*G06N 20/00* (2019.01)

(52) U.S. Cl.
CPC .... *B60W 60/0015* (2020.02); *B60W 60/0013* (2020.02); *G06N 20/00* (2019.01)

(58) Field of Classification Search
CPC .......... B60W 60/0015; B60W 60/0013; G06N 20/00; G06N 3/044; G06N 3/0464; G06N 3/084; G06N 3/0475; G06N 3/096; G06N 3/045; G06V 10/774; G06V 10/82; G06V 20/56
See application file for complete search history.

(56) References Cited

U.S. PATENT DOCUMENTS 11,940,793 B1 * 3/2024 Kavalar ................ B60W 60/00

* cited by examiner

*Primary Examiner* — Brian P Sweeney

(57) ABSTRACT

Systems and techniques are provided for rare scenario handling in autonomous vehicles. In some aspects, an AV management system can determine a target likelihood value range for identifying relevant rare scenarios. In some cases, the AV management system may use the target likelihood value range to generate new relevant rare scenarios that have a likelihood value that falls within the target likelihood value range. In some examples, the AV management system may initiate simulations of the generated relevant rare scenarios and capture synthetic AV scene data, which can be used to train machine learning models used in AVs. As a result, the performance of the AVs may be improved when faced with rare scenarios.

18 Claims, 7 Drawing Sheets

RARE SCENARIO HANDLING FOR AUTONOMOUS VEHICLES

BACKGROUND

1. Technical Field

The present disclosure generally relates to autonomous vehicles and, more specifically, to rare scenario handling for autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. For example, the internal computing system may utilize machine learning models to interpret the data and measurements and decide on what actions should be performed to maintain a safe and comfortable riding experience.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
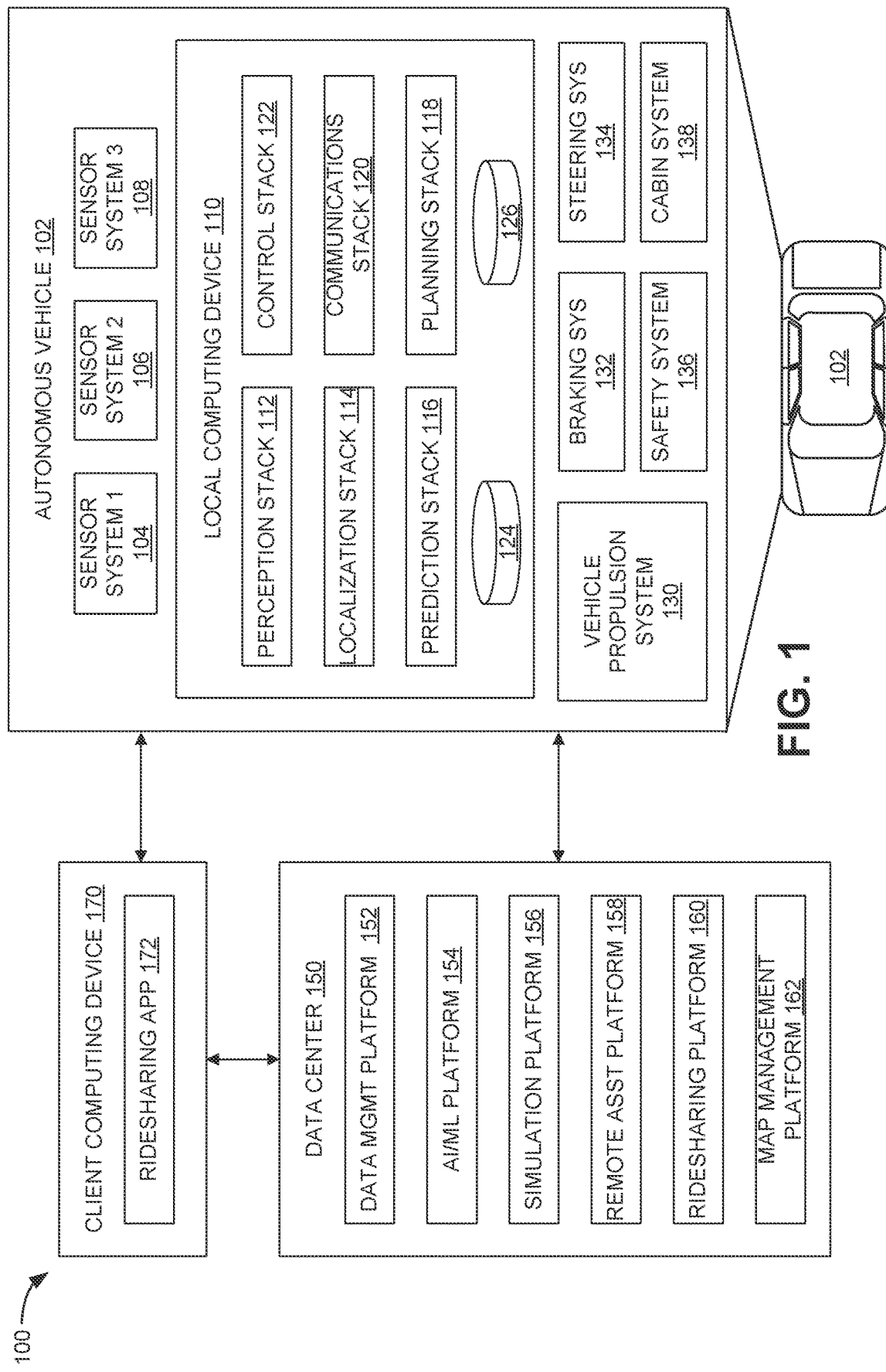
FIG. 1 is a diagram illustrating an example autonomous vehicle (AV) management system, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the current environment of the AVs (e.g., AV scenes) and move without human input. For example, AVs can include sensors such as a camera sensor, a LIDAR sensor, and/or a RADAR sensor, amongst others, which the AVs can use to collect AV scene data (e.g., sensor data and measurements) that is used for various AV operations. The sensors can provide the AV scene data to an internal computing system of the AV, which can then use the AV scene data to control mechanical systems of the AV, such as a vehicle propulsion system, a braking system, and/or a steering system, etc. For example, the internal computing system may use the AV scene data as input into machine learning models that interpret the AV scene data and provide outputs which are used to decide what actions should be performed to maintain a safe and comfortable riding experience.

The machine learning models (e.g., machine learning algorithms) used by AVs are generated (e.g., trained) using AV scene data gathered during operation of multiple AVs. The AV scene data describes the real-world environment of the AVs as they operate in various real-life scenarios. A scenario may be a specified time period, such as 1 second 10 seconds, 30 seconds, 1 minute, and the like. The AV scene data may describe the location, speed and trajectory of the AV and objects present in the surrounding environment of the AV during the various real-life scenarios. The performance of the machine learning models in a particular scenario is related to the amount of AV scene data describing the same or a similar scenario that was used to train the machine learning model. For example, the performance of a machine learning model in a particular scenario is improved as the amount of AV scene data describing a same or similar scenario is used to train/retrain the machine learning model.

One challenge with training machine learning models for use with AVs is capturing AV scene data describing rare scenarios (e.g., rare events). Rare scenarios can be scenarios that, while possible, are not a likely to occur during daily driving (e.g., scenarios that occur infrequently). For example, a rare scenario may include a person unexpectedly running across the street, a vehicle running a red light, and the like. As these scenarios occur infrequently during daily driving, capturing a sufficient or desired amount of real-world AV scene data describing these scenarios to train machine learning models may take a long time.

Synthetic AV scene data can be generated using computer-generated simulations to increase the amount of AV scene data available to train machine learning models to perform well in rare scenarios. Computer-generated simulations simulate real-life scenarios and generate synthetic AV scene data describing the location, speed, and trajectory of the AV and objects present in the surrounding environment of the AV during the scenario. Due to the nearly infinite number of possible scenarios and the considerable time and computing resources needed to simulate each, targeting the most relevant rare scenarios is preferable. The most relevant rare scenarios may be scenarios that are most likely to occur and affect operation of the AV, but for which adequate AV scene data is not available to train the machine learning models and/or additional AV scene data is preferable.

To alleviate the above-described issues with generating synthetic AV scene data describing relevant rare scenarios, an AV management system can determine a target likelihood value range for rare scenario simulation based on the already available AV scene data. For example, the AV management system can use likelihood values describing the likelihood of occurrence of the scenarios described by the available AV scene data to determine a target likelihood value range for relevant rare scenario simulation. In some cases, the target likelihood value range can encompass a range of values including the highest likelihood values for which the amount of available AV scene data is not adequate and/or preferable to train the machine learning models.

In some aspects, using a maximum likelihood can allow the system to generate sufficiently rare events that may be difficult or impossible to generate using data that is collected during standard AV fleet operations. In some cases, the maximum likelihood can be a function (e.g., multiplication) of the number of AVs available, utilization of the available AVs, and duration of data collection. In some instances, the minimum likelihood can allow elimination of events that are so rare that they are operationally irrelevant (e.g., a meteor crashing on the road right in front of the AV constitutes such low probability event). In some aspects, the minimum likelihood can be chosen to be a multiple of the maximum likelihood. In one illustrative example, the minimum likelihood can be configured as $1/100$ of maximum likelihood.

The AV management system can use the target likelihood value range to generate new relevant rare scenarios that have a likelihood value that falls within the target likelihood value range. To accomplish this, the AV management system may initially generate a known scenario based on the available AV scene data and then modify the known scenario to generate anew scenario. For example, the AV management system may select a time interval within the known scenario and modify the AV scene data describing the time interval to inject a new object (e.g., person, vehicle, etc.) into the scenario and configure its behavior in a specified manner. The behavior may be configured through use of a generative adversarial network (GAN) or by selecting a behavior from a set of possible behaviors associated with the object. The AV management system may then determine a likelihood value indicating the likelihood of occurrence of the newly created scenario. In some aspects, if the likelihood value falls within the target likelihood value range, the AV management system can determine that the new scenario is a relevant rare scenario and simulate the new scenario to generate synthetic AV scene data. In some examples, if the likelihood value does not fall within the target likelihood value range, the AV management system may determine that the new scenario is not a relevant rare scenario and may not simulate the new scenario. As a result, new scenarios that fall within the target likelihood value range can be simulated, thereby prioritizing relevant rare scenarios, while also reducing the time and computing resources associated with generating synthetic AV scene data describing relevant rare scenarios.

In some cases, this process may be repeated iteratively as additional AV scene data (both actual and synthetic) is captured/generated and used to train machine learning models. For example, the AV management system can generate updated target likelihood ranges based on the growing and updated amount of AV scene data. As a result, the likelihood of the relevant rare scenarios that are simulated by the AV management system may decrease over time as the machine learning models become trained to perform in a greater number of progressively less likely scenarios.

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill in the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108 (e.g., EV scene data), roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms (e.g., machine learning models) for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from AV scene data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on. The simulation platform 156 may also generate synthetic AV scene data based on the simulated real-world scenarios it creates. This may include generating synthetic AV scene data describing relevant rare scenarios, as will be described in greater detail below in relation to FIGS. 2-5.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

As noted above, the time it takes for an AV to process sensor input data may vary based on many different factors. For instance, the complexity of the environment surrounding the AV (e.g., scene complexity) can cause variations in compute time because of the amount of sensor data that is collected, and the processing time required to identify objects in the scene, predict behavior of the objects, etc. In some cases, an AV may initiate a safe stop if the AV determines that the latency in processing input data exceeds a safety threshold and/or a passenger comfort threshold.

Figure 2:
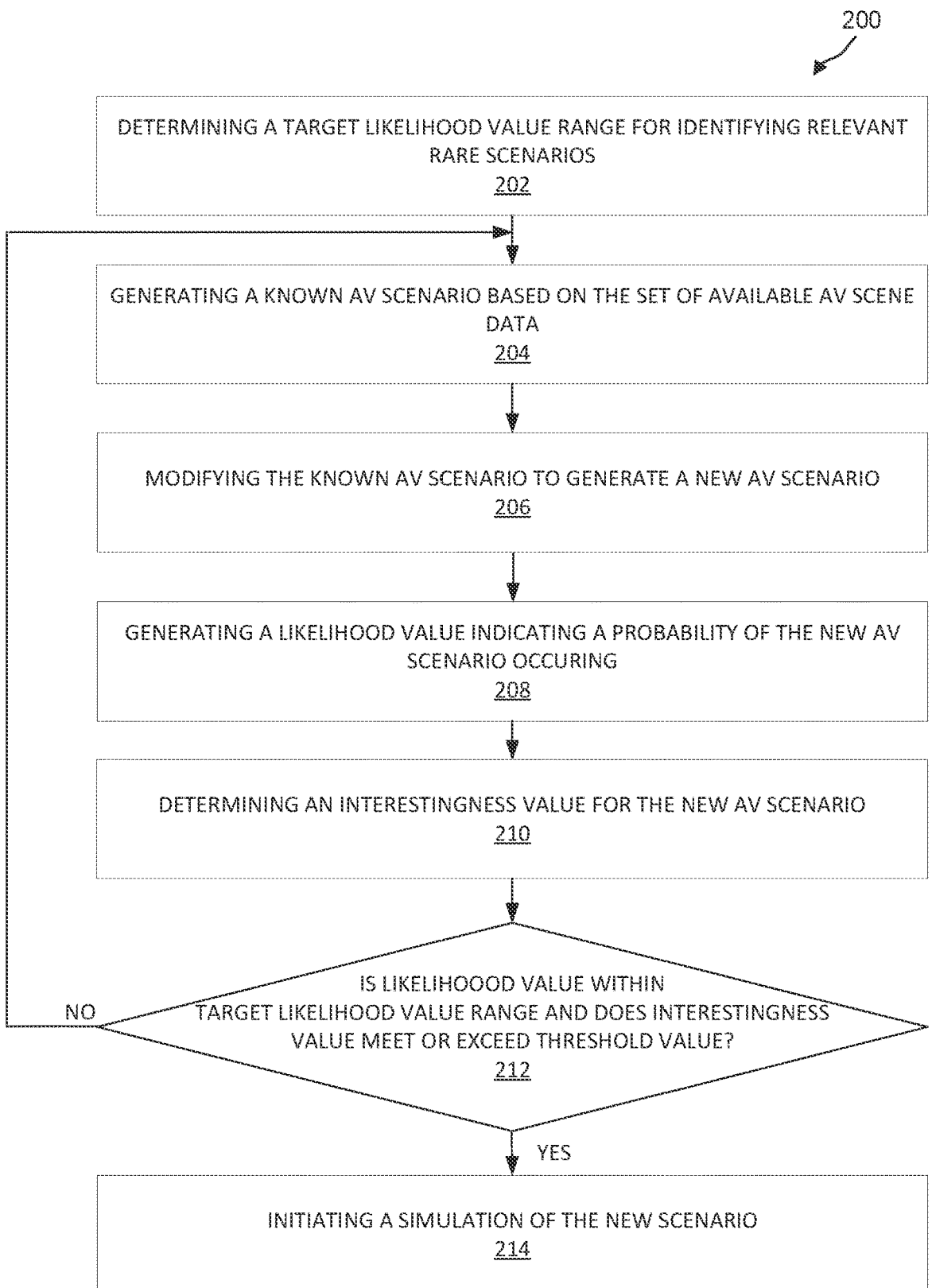
FIG. 2 is a flowchart diagram illustrating an example process for simulating relevant rare scenarios, according to some examples of the present disclosure.

FIG. 2 is a flowchart diagram illustrating an example process 200 for simulating relevant rare scenarios, according to some examples of the present disclosure.

At block 202, the process 200 includes determining a target likelihood value range for identifying relevant rare scenarios. Rare scenarios can be scenarios that, while possible, are not likely to occur during daily driving. For example, a rare scenario may include occurrence of a rare event, such as a person unexpectedly running across the street, a vehicle running a red light, and the like. As these scenarios occur infrequently during daily driving, capturing a sufficient or desired amount of real-world AV scene data describing these scenarios to train a machine learning model may take a long time. Accordingly, synthetic AV scene data generated during simulations of rare scenarios can be generated and used to train machine learning models for use in AVs.

Due to the nearly infinite number of possible scenarios and the considerable time and computing resources needed to simulate each scenario, targeting the most relevant rare scenarios is preferable. The most relevant rare scenarios may be scenarios that are more or most likely to occur and affect operation of the AV, but for which adequate AV scene data is not available to train the machine learning models and/or additional AV scene data is preferable. To improve computing performance and speed when identifying generating synthetic AV scene data, the AV management system 100 (e.g., AI/ML platform 154 and/or simulation platform 156) may determine a target likelihood value range for identifying relevant rare scenarios. In some aspects, the target likelihood value range can define a range of probability values that are desired for the relevant rare scenarios. For example, the target likelihood range may identify a range of likelihood values that excludes scenarios that occur too frequently and may therefore be redundant and/or scenarios that occur too infrequently and may therefore be irrelevant. In some examples, the maximum likelihood can be chosen based on maximum likelihood of events that will not have sufficient samples in the datasets that are generated using the existing systems. For example, a likelihood corresponding to an event that may occur 1-2 times in a year may be configured as the maximum likelihood. In some aspects, the minimum likelihood may be chosen as a fraction ($1/10$, $1/100$, etc.) of the maximum likelihood. In one illustrative example, the likelihood range (e.g., range from maximum likelihood to minimum likelihood) may be an event occurring between once every 10 years to once every 6 months.

The AV management system 100 can determine the target range of likelihood values based on likelihood values determined for available AV scene data. The available AV scene data may include actual AV scene data captured during operation of an AV and/or synthetic AV scene data generated by the simulation platform 156 during a simulated AV scenario.

In some aspects, the likelihood values may indicate a likelihood or probability of occurrence of a scenario described by the available AV scene data. In some cases, the likelihood value may be represented as a value between 0 to 1, where 0 can represent a low likelihood and 1 can represent a high likelihood of occurrence of the scenario.

The likelihood values may be generated by a machine learning model generated by the AI/ML platform 154. For example, the AI/ML platform 154 may use the available AV scene data to train the machine learning model to generate the likelihood values based on a frequency (e.g., time interval) at which the scenario occurs.

In some examples, the target likelihood value range can encompass a range of values including the highest likelihood values for which the amount of available AV scene data is not adequate and/or preferable to train the machine learning models. As a result, the AV management system 100 will target relevant scenarios that are most likely to occur.

At block 204, the process 200 includes generating a known AV scenario based on the set of available AV scene data. The AV management system 100 (e.g., simulation platform 156) can use the target likelihood value range to generate new relevant scenarios that have a likelihood value that falls within the target likelihood value range. In some cases, the AV management system 100 may initially generate a known scenario based on the available AV scene data. In some instances, a known scenario may be a scenario that is described by the available AV scene data. For example, the available AV scene data may include actual AV scene data that was previously captured by an AV experiencing the known scenario and/or the available AV scene data may include synthetic AV scene data that was previously captured during a simulation of the known scenario.

At block 206, the process 200 includes modifying the known AV scenario to generate anew AV scenario. To generate anew AV scenario, the AV management system 100 (e.g., simulation platform 156) can modify the known AV scenario. For example, the AV management system 100 may modify the known scenario by injecting a new object (e.g., person, vehicle, physical object, etc.) into the known scenario and configuring the behavior of the new object in a specific manner. As an example, the object may be a pedestrian and the behavior may be running across the street at a specified trajectory and speed. As another example, the object may be a vehicle and the behavior may be braking unexpectedly. In some instances, the AV management system 100 may select multiple objects to generate a new AV scenario.

In some aspects, to modify the known AV scenario, the AV management system 100 may initially select a time interval (e.g., 1 second, 10 seconds, 20 seconds) within the known scenario. The AV management system 100 may then access a subset of the available AV scene data that describes the selected time interval and modify the AV scene data to inject the new object and configure the behavior of the object. The AV management system 100 may select the object from a set of available objects using any suitable selection algorithm.

In some cases, the AV management system 100 configures the behavior of the new object through use of a generative adversarial network (GAN). For example, the GAN may be trained to generate realistic behaviors for given objects. In this type of embodiment, the AV management system 100 may provide an input to the GAN that indicates the selected object, and the GAN may provide an output defining the behavior to be attributed to the object in the new AV scenario.

In some examples, the AV management system 100 configures the behavior of the new object by selecting a behavior from a set of possible behaviors associated with the object. For example, each type of object may be associated with a list of possible behaviors that the type of object can perform. As an example, a vehicle may be associated with behaviors such as braking, swerving, accelerating, and the like. As another example, a pedestrian may be associated with behaviors such as running, walking, falling, and the like. The AV management system 100 modifies the AV scene data to configure the behavior of the object accordingly, thereby generating the new AV scenario.

In some aspects, modifying the known AV scenario to generate a new AV scenario may include removing an existing object from the known AV scenario. For example, the AV management system 100 (e.g., simulation platform 156) can modify the known AV scenario by removing an object such as a pedestrian, a vehicle, a stop sign, a traffic light, and/or any other object that may be included in an AV simulation scenario. In some cases, modifying the known AV scenario to generate a new AV scenario may include modifying the behavior of an existing object from the known AV scenario. For example, the AV management system 100 can modify the known AV scenario by changing the behavior of an existing object (e.g., changing the speed of a vehicle, changing the trajectory of a pedestrian, changing the status of a traffic light, etc.).

At block 208, the process 200 includes generating a likelihood value indicating a probability of the new AV scenario occurring. For example, the AV management system 100 (e.g., AI/ML platform 154) can use a machine learning model trained based on the set of available AV scene data to generate the likelihood value. The likelihood value may be any type of value (e.g., 0-1) that represents the probability of the new AV scenario occurring in real-life.

At block 210, the process 200 includes determining an interestingness value for the new AV scenario. While some scenarios may occur within the target likelihood value range, they may not be relevant for purposes of training a machine learning model for an AV. For example, a pedestrian suddenly running in an unexpected manner and direction away from the AV, poses no threat of an action or response by the AV. Accordingly, these scenarios may not be relevant for training the machine learning models used to control AV s.

In some aspects, to exclude these types of non-relevant scenarios, the AV management system 100 (e.g., AI/ML platform 154) can determine an interestingness value for the new AV scenario. In some cases, the interestingness value can indicate whether the new AV scenario will cause an affect to performance of an AV operating in the new AV scenario. In some examples, an affect to performance of an AV can be any affect that poses a safety risk and/or degradation of comfort to the rider of the AV. For example, the affect to performance on the AV may include a safety violation, a comfort issue, a close call to a safety violation (e.g., within a threshold value of an AV safety metric), a close call to a comfort issue (e.g., within a threshold value of an AV passenger comfort metric), and/or any modified performance of the AV that is different than a baseline performance of the AV.

In some examples, the AV management system 100 may generate the interestingness value using a machine learning model trained based on the available AV scene data. For example, the AV management system 100 may use AV scene data describing the new AV scenario as input to the machine learning model, which in turn generates and outputs the interestingness value.

At block 212, the process 200 includes determining whether the likelihood value is within the target likelihood value range and the interestingness value meets or exceeds a threshold value. In some aspects, a relevant rare scenario can be a scenario that both occurs within the target likelihood value range and causes an affect to performance of an AV operating in the new AV scenario. Accordingly, the AV management system 100 determines whether the likelihood value is within the target likelihood value range and whether the interestingness value meets or exceeds a threshold value. The threshold value can represent a level at which the interestingness value of the new AV scene is sufficient to represent an affect to performance of an AV operating in the new AV scenario that is meaningful for training machine learning models.

In some examples, if either the likelihood value is not within the target likelihood value range or the interestingness value does not meet or exceed the threshold value, the new scenario is determined to not be a relevant rare scenario and the process 200 returns to block 204. In this type of situation, the AV management system 100 can repeat the above discussed blocks of the process 200 until a relevant rare scenario is found.

Alternatively, in some cases, if the likelihood value falls within the target likelihood value range and the interestingness value meets or exceeds the threshold value, the new scenario is determined to be a relevant rare scenario and the process 200 continues to block 214.

At block 214, the process 200 includes initiating a simulation of the new scenario. For example, the AV management system 100 (e.g., simulation platform 156) may further modify the AV scene data describing the new AV scene to update the new AV scenario. The AV management system 100 may then use the updated AV scene data to initiate a simulation of the new AV scene. In some cases, after simulation of the new scenario, the simulation may be stored and/or used with other simulations for training the machine learning models (e.g., as discussed in connection with process 300 below).

In some aspects, the process 200 may be repeated to identify multiple relevant rare scenarios. Once a relevant rare scenario is identified, the AV management system 100 may identify one or more similar relevant rare scenarios by making slight modifications to the initially identified relevant rare scenario, as is described in relation to FIG. 5 below.

In some examples, process 200 may also be repeated iteratively as additional AV scene data (both actual and synthetic) is captured/generated and may be used to train machine learning models. For example, the AV management system 100 can generate updated target likelihood ranges based on the growing and updated amount of AV scene data. As a result, the likelihood of the relevant rare scenarios that are simulated by the AV management system may decrease over time as the machine learning models become trained to perform in a greater number of progressively less likely scenarios.

In some aspects, process 200 may identify relevant rare scenarios without consideration of the interestingness value. In these types of cases, the AV management system 100 may not determine an interestingness value for the new AV scenario and the determination of whether the new AV scenario is a relevant rare scenario may not be conditioned upon the interestingness value meeting or exceeding a threshold value.

Figure 3:
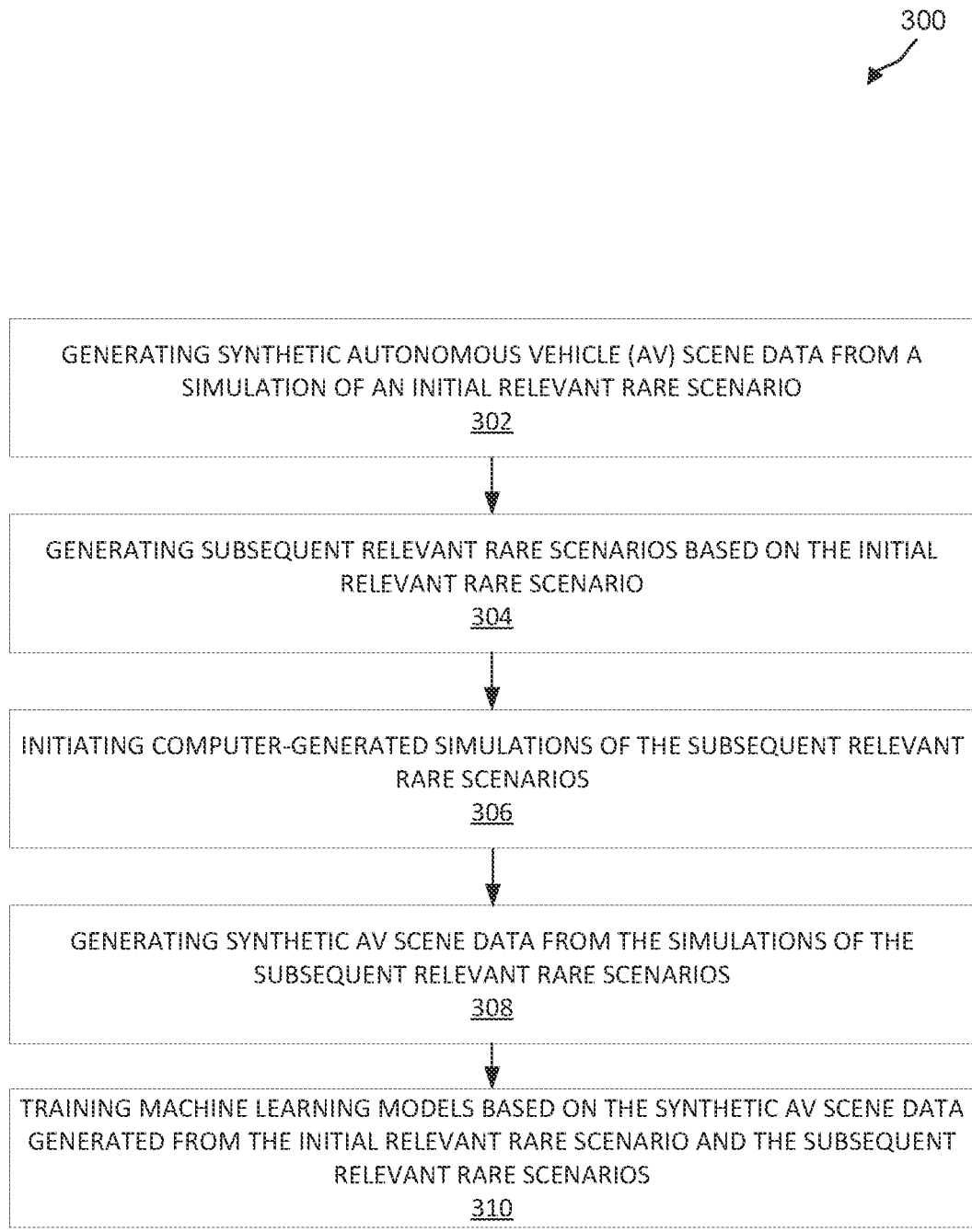
FIG. 3 is a flowchart diagram illustrating an example process for training a machine learning model to handle relevant rare scenarios, according to some examples of the present disclosure.

FIG. 3 is a flowchart diagram illustrating an example process 300 for training a machine learning model to handle relevant rare scenarios, according to some examples of the present disclosure.

At operation 302, the process 300 includes generating synthetic AV scene data from a simulation of an initial relevant rare scenario. In some cases, the initial relevant rare scenario may be identified, and the simulation initiated using the process 200 shown in FIG. 2. The synthetic AV scene data can describe the location, trajectory, and speed of an AV and objects during the relevant rare scenario.

At block 304, the process 300 includes generating subsequent relevant rare scenarios based on the initial relevant rare scenario. A subsequent relevant rare scenario may be a relevant rare scenario that is similar to the initial relevant rare scenario. For example, a subsequent relevant rare scenario may include the same object or objects as the initial relevel rare scenario, but with slightly modified behaviors. The AV management system 100 (e.g., simulation platform 156) may generate the subsequent rare scenarios using the process 500 discussed in relation to FIG. 5 below.

At block 306, the process 300 includes initiating computer-generated simulations of the subsequent relevant rare scenarios. The AV management system 100 (e.g., simulation platform 156) may initiate the computer-generated simulation as described at block 214 of the process 200 shown in FIG. 2.

At block 308, the process 300 includes generating synthetic AV scene data from the simulations of the subsequent relevant rare scenarios. The synthetic AV scene data can describe the location, trajectory, and speed of an AV and objects during the subsequent relevant rare scenario.

At block 310, the process 300 includes training machine learning models based on the synthetic AV scene data generated from the simulations of the initial relevant rare scenarios and the subsequent relevant rare scenarios. This can include training and/or retraining the machine learning models. In some examples, training the machine learning models based on the synthetic AV scene data generated from the simulations of the initial relevant rare scenarios and the subsequent relevant rare scenarios can improve the performance of the machine learning models during occurrence of similar rare scenarios. After training, the machine learning models can be implemented to manage operations of AV s.

Figure 4:
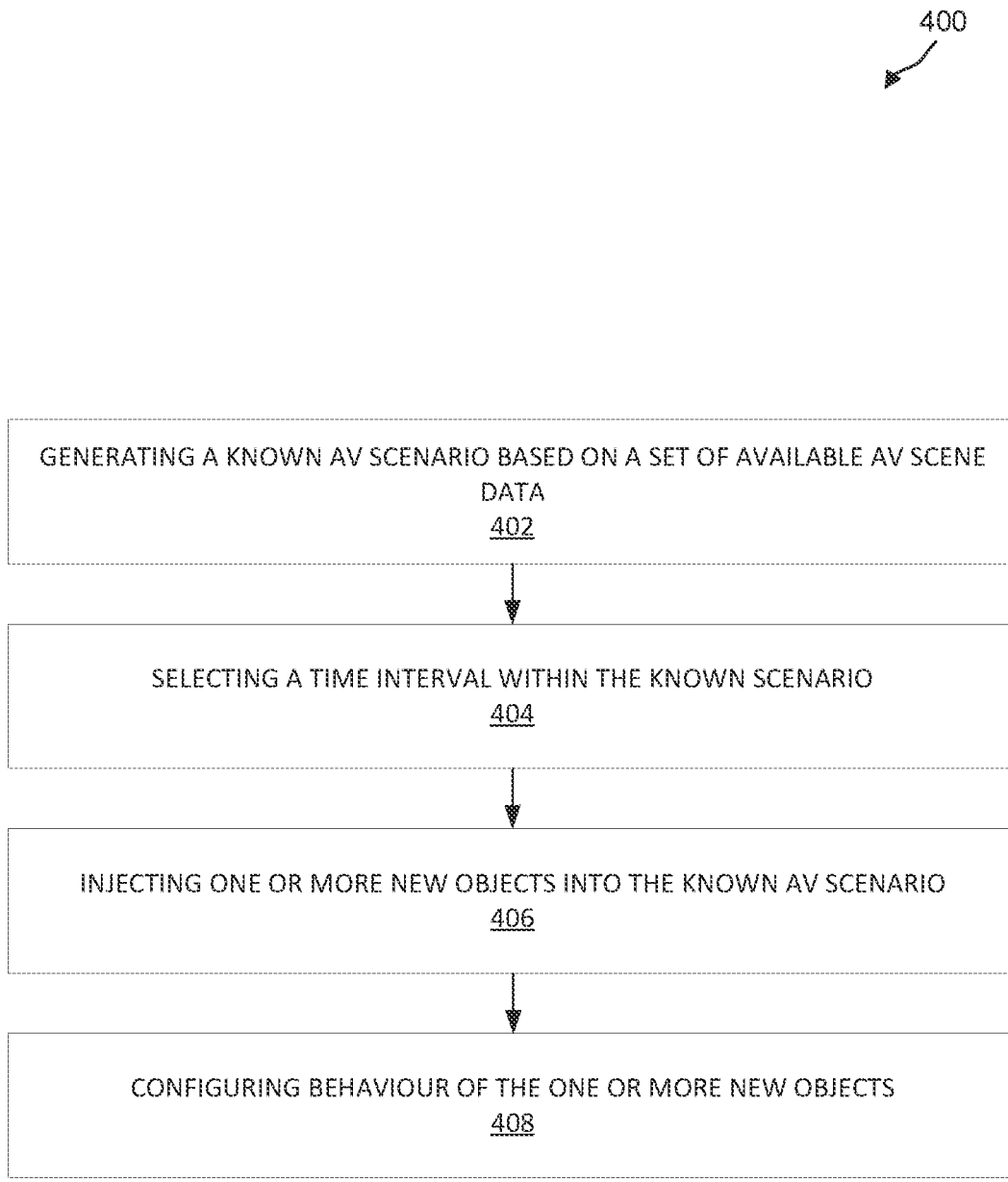
FIG. 4. is a flowchart diagram illustrating an example process for generating a new scenario based on available AV scene data, according to some examples of the present disclosure.

FIG. 4. is a flowchart diagram illustrating an example process 400 for generating a new AV scenario based on available AV scene data, according to some examples of the present disclosure.

At block 402, the process 400 includes generating a known AV scenario based on the set of available AV scene data. The known scenario is a scenario that is described by the available AV scene data. For example, the available AV scene data may include actual AV scene data that was previously captured by an AV experiencing the known scenario and/or the available AV scene data may include synthetic AV scene data that was previously captured during a simulation of the known scenario.

At block 404, the process 400 includes selecting a time interval within the known scenario. The time interval may include any subset of the known AV scenario, such as a 1, 5, 10, 15 second interval.

At block 406, the process 400 includes injecting one or more new objects into the known AV scenario. To generate a new AV scenario, the AV management system 100 (e.g., simulation platform 156) modifies the selected time interval of the known AV scenario. For example, the AV management system 100 may modify the known AV scenario by injecting a new object (e.g., person, vehicle, physical object, etc.) into the known AV scenario and configuring the behavior of the new object in a specific manner. As an example, the object may be a pedestrian and the behavior may be running across the street at a specified trajectory and speed. As another example, the object may be a vehicle and the behavior may be braking unexpectedly. In some embodiments, the AV management system 100 may select multiple objects to generate a new AV scenario (e.g., multiple objects may be injected/introduced into a known AV scenario).

The AV management system 100 may select the one or more objects from a list of available objects at random or using a predetermined selection algorithm. To inject an object into the known AV scenario, the AV management system 100 may access a subset of the available AV scene data that describes the selected time interval. The AV management system 100 then modifies the AV scene data to inject the selected objects.

While in process 400 the new AV scenario is generated by injecting one or more new objects into the known AV scenario, this is just one example and is not meant to be limiting. Additionally, or alternatively, in some aspects, the new AV scenario may be generated by removing one of more objects from the known AV scenario and/or modifying one of more objects from the known AV scenario. Block 406 of the process 400 may include any of the combination of the scenarios described above (e.g., adding new objects, removing existing object, and/or modifying existing objects) and this disclosure contemplates all such variations. For example, one or more new objects may be inserted, one or more existing objects may be removed, and one or more existing objects may be modified.

At block 408, the process 400 includes configuring behavior of the one or more objects. In some aspects, the AV management system 100 can configure the behavior of the new object through use of a generative adversarial network (GAN). For example, the GAN may be trained to generate realistic behaviors for given objects. In this type of example, the AV management system 100 may provide an input to the GAN that indicates a selected object. In some instances, the GAN can provide an output defining the behavior to be associated with the object.

In some cases, the AV management system 100 configures the behavior of the new object by selecting a behavior from a set of possible behaviors associated with the object. For example, each type of object may be associated with a list of possible behaviors that the type of object can perform. As an example, a vehicle may be associated with behaviors such as braking, swerving, accelerating, and the like. As another example, a pedestrian may be associated with behaviors such as running, walking, falling, and the like. The AV management system 100 modifies the AV scene data to configure the behavior of the one r more objects accordingly, thereby generating the new AV scenario.

Figure 5:
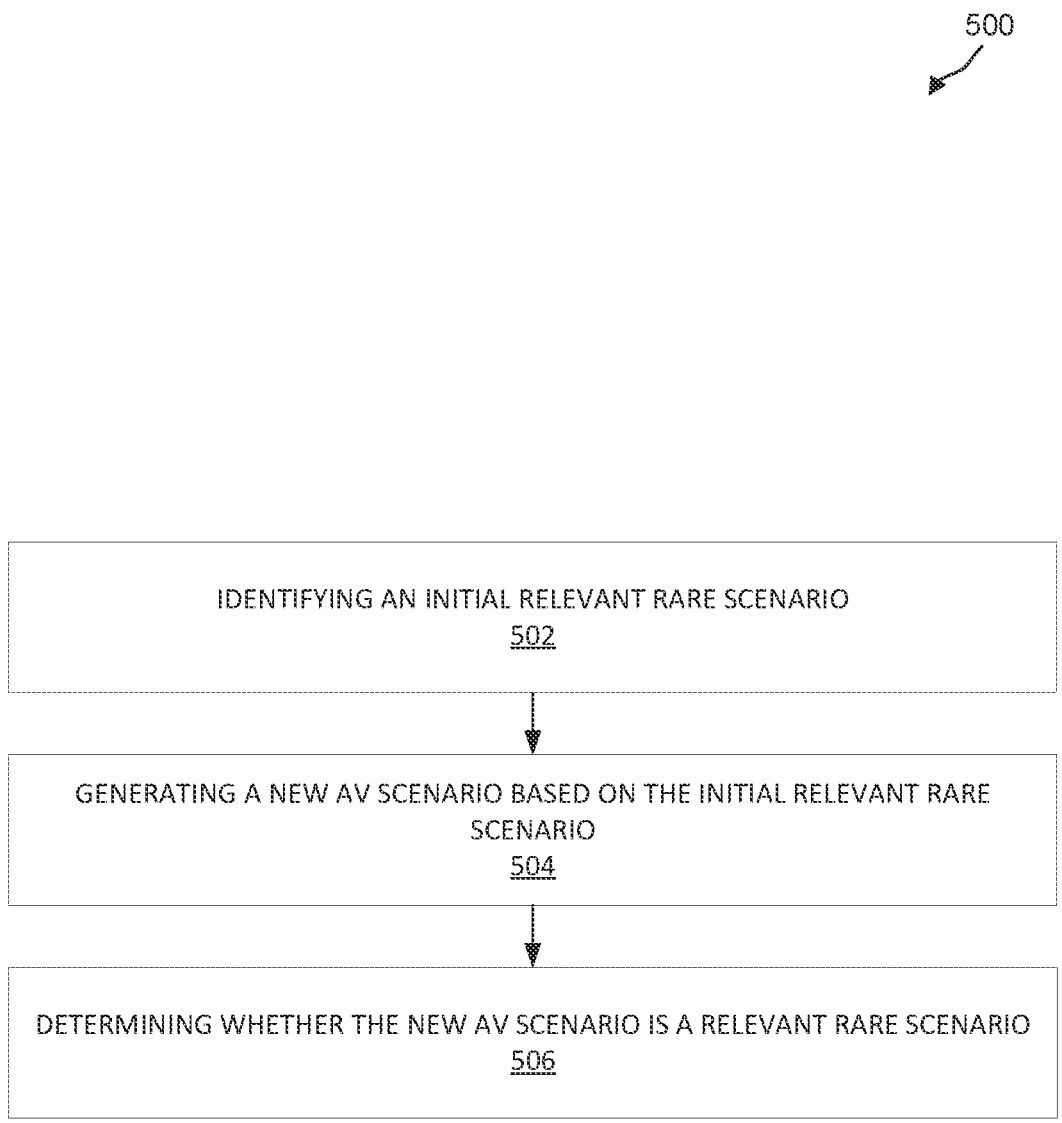
FIG. 5. is a flowchart diagram illustrating an example process for generating subsequent new relevant rare scenarios based on an initial relevant rare scenario, according to some examples of the present disclosure.

FIG. 5. is a flowchart diagram illustrating an example process 500 for generating subsequent new relevant rare scenarios based on an initial relevant rare scenario, according to some examples of the present disclosure.

At block 502, the process 500 includes identifying an initial relevant rare scenario. For example, the initial relevant rare scenario may be identified using the process 200 shown in FIG. 2.

At block 504, the process 500 includes generating a new AV scenario based on the initial relevant rare scenario. For example, the AV management system 100 (e.g., simulation platform 156) may generate the new scenario by making one or more minor modifications to the AV scene data describing the initial relevant scenario. This may include making a change to the behavior of an object injected to generate the initial relevant rare scenario, adding a new object, adjusting parameters of the AV, and the like. In some examples, the AV management system 100 can make minor modifications to an identified relevant rare scenario in order to generate similar relevant rare scenarios.

At block 506, the process 500 includes determining whether the new AV scenario is a relevant rare scenario. For example, the AV management system 100 may generate a likelihood value and interestingness value for the new AV scenario and determine whether the likelihood value falls within a target range and the interestingness value meets or exceeds a threshold value, as described in the process 200 shown in FIG. 2.

Figure 6:
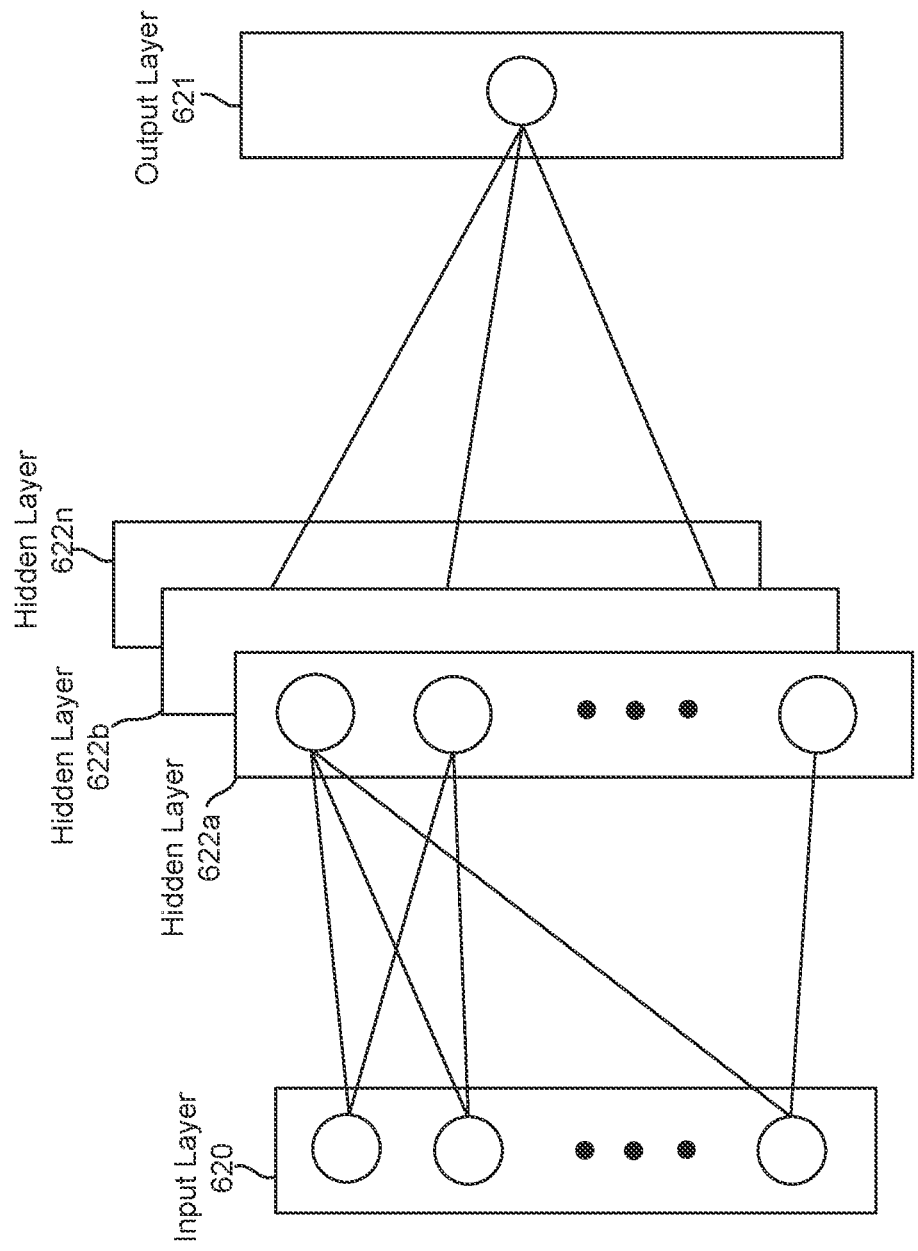
FIG. 6 illustrates an example of a deep learning neural network that can be used in accordance with some examples of the present disclosure.

FIG. 6 illustrates an example of a deep learning neural network 600 that can be used in accordance with some examples of the present disclosure. As shown, an input layer 620 can be configured to receive new/modified AV scenarios (e.g., simulation scenario for training machine learning model to handle rare events). The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a likelihood value that can represent the probability of a new AV scenario occurring in real-life.

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma (½ (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
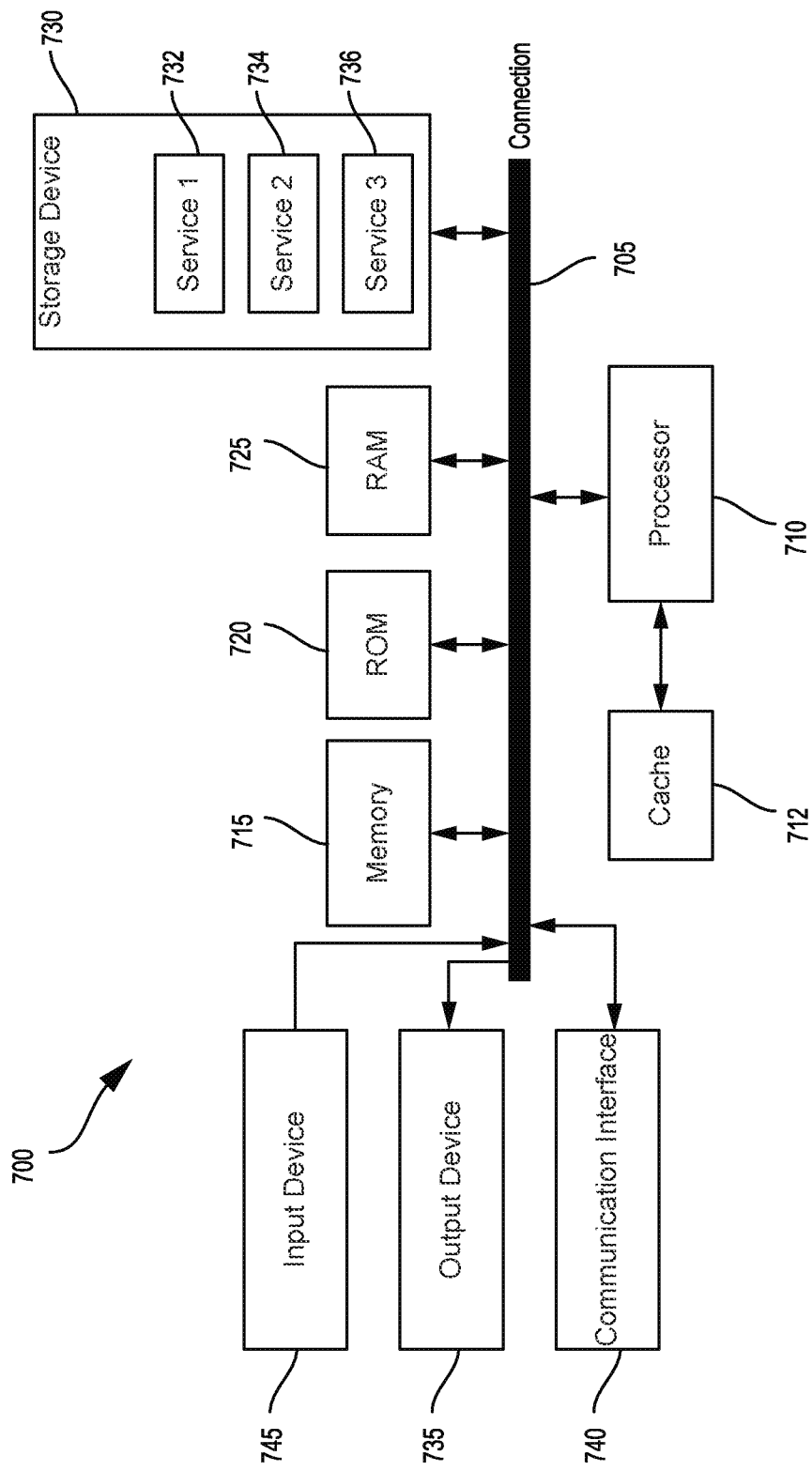
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up internal computing system 110, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

Selected Examples

Illustrative examples of the disclosure include:

Aspect 1. A method comprising: determining, based on likelihood values associated with a set of available autonomous vehicle (AV) scene data, a target likelihood value range for identifying relevant rare scenarios, the available AV scene data describing scenarios involving AVs and surrounding objects; generating a known AV scenario based on the set of available AV scene data; modifying the known AV scenario to generate a new AV scenario; generating, using a machine learning model trained based on the set of available AV scene data, a likelihood value indicating a probability of the new AV scenario occurring; determining that the likelihood value is within the target likelihood value range; and in response to determining that the likelihood value is within the target likelihood value range, initiating a computer-generated simulation of the new AV scenario.

Aspect 2. The method of Aspect 1, further comprising: capturing a set of synthetic AV scene data from the computer-generated simulation of the new scenario; training a machine learning model based on the set of synthetic AV scene data; and implementing the machine learning model to direct operation of an AV.

Aspect 3. The method of any of Aspects 1 to 2, further comprising: determining an updated target likelihood value range identifying updated relevant rare scenarios based on likelihood values associated with the set of available AV scene data and the set of synthetic AV scene data, the updated target likelihood value range including at least a first portion that is less than the target likelihood value range.

Aspect 4. The method of any of Aspects 1 to 3, further comprising: modifying the known AV scenario to generate a second new AV scenario; generating, using the machine learning model trained based on the set of available AV scene data, a second likelihood value indicating a probability of the second new AV scenario occurring; and determining that the second new AV scenario should not be simulated based on determining that the second likelihood value is not within the target likelihood value range.

Aspect 5. The method of any of Aspects 1 to 4, further comprising: based on determining that the likelihood value is within the target likelihood value range, modifying the new AV scenario to generate a second new AV scenario; generating, using the machine learning model trained based on the set of available AV scene data, a second likelihood value indicating a probability of the second new AV scenario occurring; determining that the second likelihood value is within the target likelihood value range; and in response to determining that the second likelihood value is within the target likelihood value range, initiating a computer-generated simulation of the second new AV scenario.

Aspect 6. The method of any of Aspect 1 to 5, further comprising: determining a value indicating whether the new AV scenario will cause an affect to performance of an AV operating in the new AV scenario; and determining that the value meets or exceeds a threshold value, wherein initiating the computer-generated simulation of the new AV scenario is performed based on determining that the value meets or exceeds the threshold value.

Aspect 7. The method of any of Aspects 1 to 6, wherein the affect to performance of the AV operating in the new autonomous vehicle scenario comprises at least one of: a safety violation, a comfort issue, a close-call to a safety violation, a close call to a comfort issue, and a modified performance of the AV that is different than a baseline performance of the AV.

Aspect 8. The method of any of Aspects 1 to 7, wherein modifying the known AV scenario to generate the new AV scenario comprises: determining a time interval described by a subset of the set of available AV scene data; modifying the subset of the set of available AV scene data to inject a new object; and configuring a behavior of the new object within the time interval.

Aspect 9. The method of any of Aspects 1 to 8, wherein configuring the behavior of the new object within the time interval comprises: selecting a first behavior from a set of possible behaviors associated with the new object.

Aspect 10. The method of any of Aspects 1 to 8, wherein configuring the behavior of the new object within the time interval comprises: generating the behavior using a generative adversarial network.

Aspect 11. The method of any of Aspects 1 to 10, wherein modifying the known AV scenario to generate the new AV scenario comprises: removing an existing object from the known AV scenario.

Aspect 12. The method of any of Aspects 1 to 11, wherein modifying the known AV scenario to generate the new AV scenario comprises: modifying a behavior of an existing object from the known AV scenario.

Aspect 13. A system comprising: one or more computer processors; and one or more computer-readable mediums storing instructions that, when executed by the one or more computer processors, cause the system to perform operations comprising: determining, based on likelihood values associated with a set of available autonomous vehicle (AV) scene data, a target likelihood value range for identifying relevant rare scenarios, the available AV scene data describing scenarios involving AVs and surrounding objects; generating a known AV scenario based on the set of available AV scene data; modifying the known AV scenario to generate a new AV scenario; generating, using a machine learning model trained based on the set of available AV scene data, a likelihood value indicating a probability of the new AV scenario occurring; determining that the likelihood value is within the target likelihood value range; and in response to determining that the likelihood value is within the target likelihood value range, initiating a computer-generated simulation of the new AV scenario.

Aspect 14. The system of Aspect 13, the operations further comprising: capturing a set of synthetic AV scene data from the computer-generated simulation of the new scenario; training a machine learning model based on the set of synthetic AV scene data; and implementing the machine learning model to direct operation of an AV.

Aspect 15. The system of any of Aspects 11 to 14, the operations further comprising: determining an updated target likelihood value range identifying updated relevant rare scenarios based on likelihood values associated with the set of available AV scene data and the set of synthetic AV scene data, the updated target likelihood value range including at least a first portion that is less than the target likelihood value range.

Aspect 16. The system of any of Aspects 11 to 15, the operations further comprising: modifying the known AV scenario to generate a second new AV scenario; generating, using the machine learning model trained based on the set of available AV scene data, a second likelihood value indicating a probability of the second new AV scenario occurring; and determining that the second new AV scenario should not be simulated based on determining that the second likelihood value is not within the target likelihood value range.

Aspect 17. The system of any of Aspects 11 to 16, the operations further comprising: based on determining that the likelihood value is within the target likelihood value range, modifying the new AV scenario to generate a second new AV scenario; generating, using the machine learning model trained based on the set of available AV scene data, a second likelihood value indicating a probability of the second new AV scenario occurring; determining that the second likelihood value is within the target likelihood value range; and in response to determining that the second likelihood value is within the target likelihood value range, initiating a computer-generated simulation of the second new AV scenario.

Aspect 18. The system of any of Aspects 11 to 17, the operations further comprising: determining a value indicating whether the new AV scenario will cause an affect to performance of an AV operating in the new AV scenario; and determining that the value meets or exceeds a threshold value, wherein initiating the computer-generated simulation of the new AV scenario is performed based on determining that the value meets or exceeds the threshold value.

Aspect 19. The system of any of Aspects 11 to 18, wherein modifying the known AV scenario to generate the new AV scenario comprises: determining a time interval described by a subset of the set of available AV scene data; modifying the subset of the set of available AV scene data to inject a new object; and configuring a behavior of the new object within the time interval.

Aspect 20. The system of any of Aspects 11 to 19, wherein configuring the behavior of the new object within the time interval comprises: selecting a first behavior from a set of possible behaviors associated with the new object.

Aspect 21. The system of any of Aspects 11 to 19, wherein configuring the behavior of the new object within the time interval comprises: generating the behavior using a generative adversarial network.

Aspect 22. A non-transitory computer-readable medium storing instructions that, when executed by the one or more computing devices, cause the one or more computing devices to perform operations comprising: determining, based on likelihood values associated with a set of available autonomous vehicle (AV) scene data, a target likelihood value range for identifying relevant rare scenarios, the available AV scene data describing scenarios involving AVs and surrounding objects; generating a known AV scenario based on the set of available AV scene data; modifying the known AV scenario to generate a new AV scenario; generating, using a machine learning model trained based on the set of available AV scene data, a likelihood value indicating a probability of the new AV scenario occurring; determining that the likelihood value is within the target likelihood value range; and in response to determining that the likelihood value is within the target likelihood value range, initiating a computer-generated simulation of the new AV scenario.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   determining, based on likelihood values associated with a set of available autonomous vehicle (AV) scene data, a target likelihood value range for identifying relevant rare scenarios, the set of available AV scene data describing scenarios involving AVs and surrounding objects;
   generating a known AV scenario based on the set of available AV scene data;
   modifying the known AV scenario to generate a new AV scenario;
   generating, using a machine learning model trained based on the set of available AV scene data, a likelihood value indicating a probability of the new AV scenario occurring;
   determining that the likelihood value is within the target likelihood value range;
   in response to determining that the likelihood value is within the target likelihood value range, initiating a computer-generated simulation of the new AV scenario;
   capturing a set of synthetic AV scene data from the computer-generated simulation of the new AV scenario;
   training a machine learning model based on the set of synthetic AV scene data; and
   implementing the machine learning model to direct operation of an AV.

2. The method of claim 1, further comprising:
   determining an updated target likelihood value range identifying updated relevant rare scenarios based on likelihood values associated with the set of available AV scene data and the set of synthetic AV scene data, the updated target likelihood value range including at least a first portion that is less than the target likelihood value range.

3. The method of claim 1, further comprising:
   modifying the known AV scenario to generate a second new AV scenario;
   generating, using the machine learning model trained based on the set of available AV scene data, a second likelihood value indicating a probability of the second new AV scenario occurring; and determining that the second new AV scenario should not be simulated based on determining that the second likelihood value is not within the target likelihood value range.

4. The method of claim 1, further comprising:

based on determining that the likelihood value is within the target likelihood value range, modifying the new AV scenario to generate a second new AV scenario;

generating, using the machine learning model trained based on the set of available AV scene data, a second likelihood value indicating a probability of the second new AV scenario occurring;

determining that the second likelihood value is within the target likelihood value range; and in response to determining that the second likelihood value is within the target likelihood value range, initiating a computer-generated simulation of the second new AV scenario.

5. The method of claim 1, further comprising:

determining a value indicating whether the new AV scenario will cause an affect to performance of an AV operating in the new AV scenario; and determining that the value meets or exceeds a threshold value, wherein initiating the computer-generated simulation of the new AV scenario is performed based on determining that the value meets or exceeds the threshold value.

6. The method of claim 5, wherein the affect to performance comprises at least one of a safety violation, a comfort issue, a close-call to a safety violation, a close call to a comfort issue, and a modified performance of the AV that is different than a baseline performance of the AV.

7. The method of claim 1, wherein modifying the known AV scenario to generate the new AV scenario comprises:

determining a time interval described by a subset of the set of available AV scene data;

modifying the subset of the set of available AV scene data to inject a new object; and configuring a behavior of the new object within the time interval.

8. The method of claim 7, wherein configuring the behavior of the new object within the time interval comprises:

selecting a first behavior from a set of possible behaviors associated with the new object.

9. The method of claim 7, wherein configuring the behavior of the new object within the time interval comprises:

generating the behavior using a generative adversarial network.

10. A system comprising:

one or more computer processors; and one or more computer-readable mediums storing instructions that, when executed by the one or more computer processors, cause the system to perform operations comprising:

determine, based on likelihood values associated with a set of available autonomous vehicle (AV) scene data, a target likelihood value range for identifying relevant rare scenarios, the set of available AV scene data describing scenarios involving AVs and surrounding objects;

generate a known AV scenario based on the set of available AV scene data;

modify the known AV scenario to generate a new AV scenario;

generate, using a machine learning model trained based on the set of available AV scene data, a likelihood value indicating a probability of the new AV scenario occurring;

determine that the likelihood value is within the target likelihood value range;

in response to a determination that the likelihood value is within the target likelihood value range, initiate a computer-generated simulation of the new AV scenario;

determine a value indicating whether the new AV scenario will cause an affect to performance of an AV operating in the new AV scenario; and determine that the value meets or exceeds a threshold value, wherein initiating the computer-generated simulation of the new AV scenario is performed based on determining that the value meets or exceeds the threshold value.

11. The system of claim 10, the system further configured to perform operations comprising:

capture a set of synthetic AV scene data from the computer-generated simulation of the new AV scenario;

train a machine learning model based on the set of synthetic AV scene data; and implement the machine learning model to direct operation of an AV.

12. The system of claim 11, the system further configured to perform operations comprising:

determine an updated target likelihood value range identifying updated relevant rare scenarios based on likelihood values associated with the set of available AV scene data and the set of synthetic AV scene data, the updated target likelihood value range including at least a first portion that is less than the target likelihood value range.

13. The system of claim 10, the system further configured to perform operations comprising:

modify the known AV scenario to generate a second new AV scenario;

generate, using the machine learning model trained based on the set of available AV scene data, a second likelihood value indicating a probability of the second new AV scenario occurring; and determine that the second new AV scenario should not be simulated based on determining that the second likelihood value is not within the target likelihood value range.

14. The system of claim 10, the system further configured to perform operations comprising:

based on a determination that the likelihood value is within the target likelihood value range, modify the new AV scenario to generate a second new AV scenario;

generate, using the machine learning model trained based on the set of available AV scene data, a second likelihood value indicating a probability of the second new AV scenario occurring;

determine that the second likelihood value is within the target likelihood value range; and in response to a determination that the second likelihood value is within the target likelihood value range, initiate a computer-generated simulation of the second new AV scenario.

15. The system of claim 10, wherein to modify the known AV scenario to generate the new AV scenario the system is further configured to perform operations comprising:

determine a time interval described by a subset of the set of available AV scene data;

modify the subset of the set of available AV scene data to inject a new object; and configure a behavior of the new object within the time interval.

16. The system of claim 15, wherein to configure the behavior of the new object within the time interval the system is further configured to perform operations comprising:

select a first behavior from a set of possible behaviors associated with the new object.

17. The system of claim 15, wherein to configure the behavior of the new object within the time interval the system is further configured to perform operations comprising:

generate the behavior using a generative adversarial network (GAN).

18. A non-transitory computer-readable medium storing instructions that, when executed by one or more computing devices, causes the one or more computing devices to perform operations comprising:

determine, based on likelihood values associated with a set of available autonomous vehicle (AV) scene data, a target likelihood value range for identifying relevant rare scenarios, the set of available AV scene data describing scenarios involving AVs and surrounding objects;

generate a known AV scenario based on the set of available AV scene data;

modify the known AV scenario to generate a new AV scenario, wherein to modify the known AV scenario to generate the new AV scenario the system is further configured to perform operations comprising:

determine a time interval described by a subset of the set of available AV scene data;

modify the subset of the set of available AV scene data to inject a new object; and configure a behavior of the new object within the time interval;

generate, using a machine learning model trained based on the set of available AV scene data, a likelihood value indicating a probability of the new AV scenario occurring;

determine that the likelihood value is within the target likelihood value range; and in response to determining that the likelihood value is within the target likelihood value range, initiate a computer-generated simulation of the new AV scenario.

* * * * *